Figure 1:
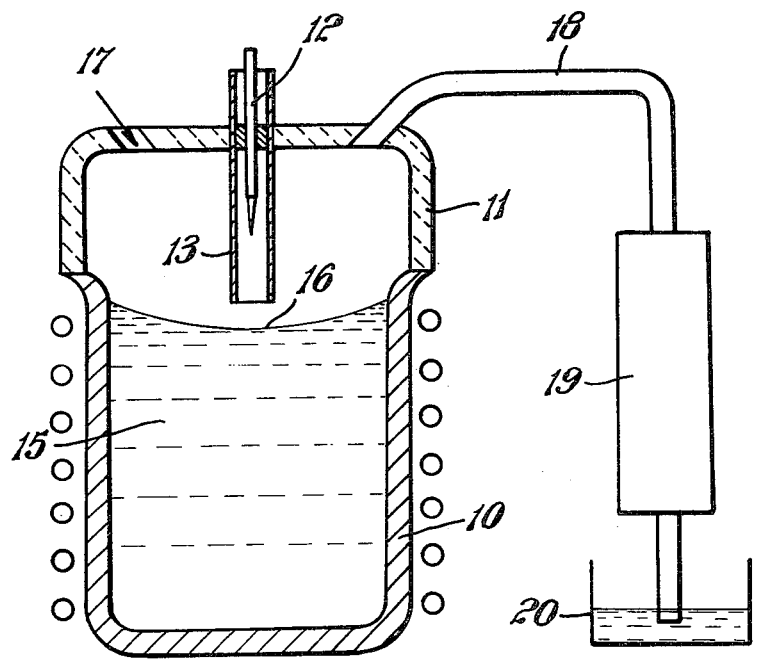

3,231,335
PROCESS FOR RECOVERING PHOSPHORUS FROM FERROPHOSPHORUS
Patricia Mary Bills, Isleworth, Geoffrey Hoyle, Sheffield, and Edward James Lowe, Stourton, near Stourbridge, England, assignors to Albright & Wilson (Mfg.) Limited, Birmingham, England, a British company, and The British Iron and Steel Research Association, London, England, a British company
Filed Dec. 18, 1962, Ser. No. 245,583
Claims priority, application Great Britain, Dec. 21, 1961, 45,922/61
16 Claims. (Cl. 23—223)

This invention relates to the removal and recovery of phosphorus from ferrophosphorus, by which term we mean herein mixtures of iron and phosphorus obtained as a by-product in the manufacture of phosphorus by the reduction of phosphate ores. The phosphorus content of such mixtures usually ranges from about 23%–27%. It is desirable to remove some or all of the phosphorus, which can then be used, and, in so doing, obtain a ferrous material of improved quality and increased value to the foundry industry.

In the iron and steel industry it is common practice to treat the metal so as to remove impurities which are present in small quantities of the order of 1% or less. Thus, for example, it is known to remove gases such as oxygen, nitrogen and hydrogen from steel by vacuum treatment or gas purging. In the Journal of the Iron and Steel Industry, vol. 191 at pages 172–175 some experiments in the removal of various non-gaseous impurities from steel by vacuum melting are described. One such impurity was phosphorus which initially was present in a concentration of 1.13% and after 90 minutes melting in a high vacuum, was reduced to 1.10%. Thus only about 3% of the phosphorus was removed.

Although the main part of the ferrophosphorus produced as a byproduct in the manufacture of phosphorus has for long been useless, it has not hitherto been conceived to be practicable to recover phosphorus from it, at all events as a commercial product. We have now found that it is possible to recover a substantial proportion of the phosphorus, leaving a product of enhanced value for use for example in the foundry industry. Since ferrophosphorus has not only been wasted but has presented a serious disposal problem for a century, this discovery marks a new departure in the art of phosphorus manufacture.

According to the invention phosphorus is recovered from ferrophosphorus by a process which comprises subjecting molten ferrophosphorus to a process of destructive distillation, leading off the resulting vapour and recovering the phosphorus therefrom, heat being supplied during the distillation to maintain the temperature above the melting point of the material being treated.

The destructive distillation may be carried out by subjecting the melt to a vacuum or by gas purging, that is by introducing a jet or jets of inert gas into or above the melt, or by a combination of these methods. According to a feature of our invention, we have established minimum conditions of operation to achieve a satisfactory yield of phosphorus, for example from 20–90% of the phosphorus originally present. The parameters involved are the pressure to which the melt is subjected and the volume of inert gas which is caused to flow in contact with the melt. We have found that satisfactory yields can be obtained if the melt is subjected to a pressure of substantially 10 mm. of mercury or less, or if the volume of inert gas per gram of phosphorus to be recovered is at least such as to be equivalent to a pressure of 10 mm. of mercury, allowing for the efficiency with which equilibrium between gas and melt is established. If this efficiency is denoted by E, the said minimum volume of gas is 28/E litres per gram of phosphorus to be recovered, this volume being measured at the pressure obtaining in the system. The volume of gas necesary to recover a given weight of phosphorus is independent of the pressure. The weight of gas, however, increases with pressure so that in selecting a pressure of operation, the cost of providing the necessary weight of gas and heating it to the necessary temperature must be balanced against the cost of maintaining the selected pressure. Thus, for example, if atmospheric pressure is used, the cost of maintaining this will be nil but the cost of furnishing the hot gas will be a maximum.

Satisfactory results can, as indicated above, be obtained by operating at below 10 mm. of mercury with zero gas flow. The lower the pressure, the greater the yield of phosphorus, and pressures below 1 mm. are preferred. At pressures substantially above this value the aforesaid minimum gas flow must be provided, but still better results are obtained if the gas flow is greater than this minimum. It is also possible, when operating below 10 mm. of mercury, to combine this with gas purging at any desired volume of gas flow, but the improvement in yield so obtained is only slight.

When gas purging is used, the preferred method of introducing the gas is to direct a high velocity jet on to the surface of the molten material, at a pressure of, for example 50–100 p.s.i., so that a substantial depression is produced on the surface of the melt but without causing surface disintegration. Advantageously the jet is controlled so that the surface of the melt is rendered turbulent and small droplets are detached from the surface and then fall back into the melt. If desired the jet may be hooded, for example by a tube, so that entrainment of the gas above the melt is reduced to a minimum. Using this method, the efficiency E of the gas-liquid interchange may be of the order of 50%, in which case the aforesaid minimum gas flow is 56 litres per gram of phosphorus to be recovered.

Other factors which affect the percentage of the phosphorus present in the ferrophosphorus which is recovered are the time during which the process is continued and the temperature. The longer the process continues, the greater the yield of phosphorus. Where gas purging is used, a longer time of operation implies a slower rate of gas flow in terms of volume per unit time, and hence a greater efficiency E, resulting in a greater yield of phosphorus for a given volume of gas flow. The time is, however, often determined by extraneous factors, such as the frequency with which the phosphorus furnace is tapped, it being desirable to take the ferrophosphorus straight from the furnace to the crucible in which the phosphorus removal is carried out. Another factor is the rate at which gas must be introduced by the jet method to produce the required depression in the surface of the melt. The preferred temperature of operation is 1400° C.–1550° C.

As the process is endothermic, heat must be supplied. This may be done by arc heating or induction heating. Arc heating is desirable because it causes high local, transient temperatures which aid the distillation. Induction heating, on the other hand, has the advantage of causing mixing of the molten material. This is particularly so if the melt is comparatively deep. If arc heating is used, it is advantageous to have a little slag on the surface of the ferrophosphorus, as this assists in the maintenance of the arc. The heat input required is of the order of 850 kilowatt-hours per ton of ferrophosphorus.

Suitable gases for use in the process of the invention are oxygen-free nitrogen, carbon monoxide, argon and the mixed gases from phosphorus plants. In some cases it is desirable to dry and/or to preheat the gas employed.

The accompanying drawings show by way of example five alternative apparatus for carrying out the invention. In the drawings, like reference numerals denote like parts.

Referring to FIG. 1, the apparatus comprises a high frequency induction furnace 10 provided with a refractory hood 11. Passing vertically downwards through the roof of the hood 11 is a gas supply pipe 12 connected to a supply of a suitable gas under pressure. The supply pipe 12 is surrounded by a tube 13 which protects the jet of gas which issues, in operation, from the supply pipe 12. The hood 11 is also provided with a viewing aperture 17.

In operation the furnace 10 is filled with molten ferrophosphorus 15 to the level indicated and a high velocity jet of gas is directed onto the surface of the molten ferrophosphorus through the gas supply pipe 12. This causes a depression 16 to be formed on the surface of the ferrophosphorus. Distillation of phosphorus from the ferro phosphorus takes place rapidly.

The phosphorus vapour together with the inert gas escapes through a tube 18 in the refractory hood 11, and the phosphorus is condensed in a condenser 19 of known kind and collected in vessel 20.

Figure 2:
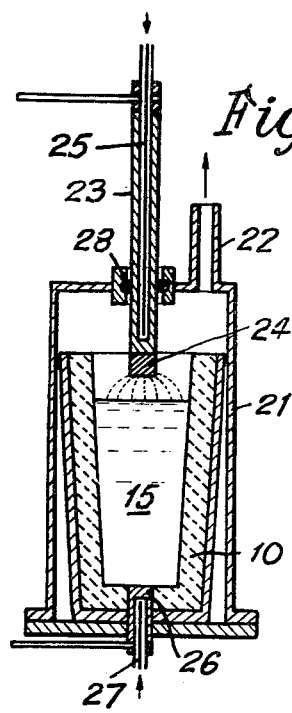

In FIG. 2, the refractory lined ladle 10 is surrounded by a vacuum-tight container 21 having an outlet pipe 22 which leads to a condenser and a source of vacuum (not shown). Heating is effected by an arc established between an electrode 23 having a carbon tip 24, and the surface of the melt 15. Cooling water for the electrode is supplied through pipe 25. Current is supplied to the melt through an electrode 26 provided with a cooling water pipe 27. The electrode 23 is fed to the work through an insulating vacuum seal 28.

Figure 3:
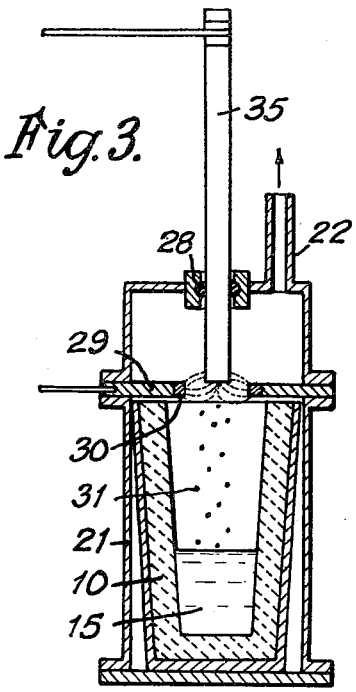

In FIG. 3 an arc is struck between an electrode 35 of ferrophosphorus and a ring electrode 29 having a carbon insert 30. Numeral 31 denotes drops of iron low in phosphorus which melt off the end of the electrode 35.

Figure 4:
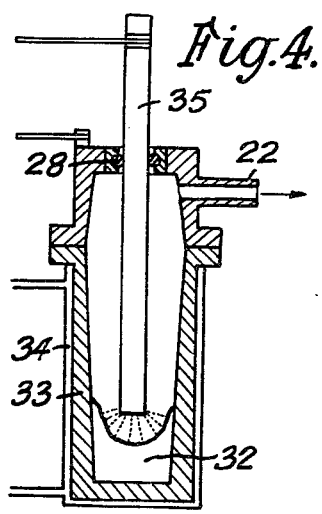

FIG. 4 shows another arrangement using an arc electrode made of ferrophosphorus. In this case the other electrode is provided by the surface of a melt of low-phosphorus iron 32. Instead of using a refractory-lined ladle, the process is carried out in a copper ingot mould 33 provided with a cooling water jacket 34. In both FIG. 3 and FIG. 4, the ferrophosphorus electrode 35 is consumed during the process.

Figure 5:
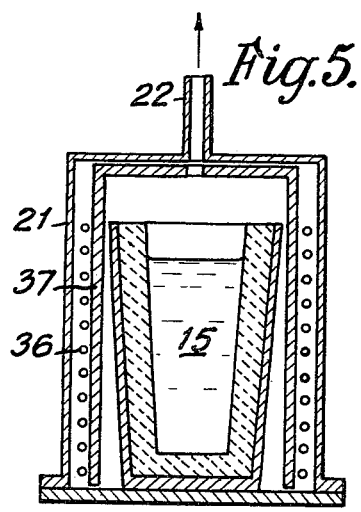

FIG. 5 shows an arrangement similar to that of FIG. 2, using induction instead of arc heating. In this figure 36 represents the induction coil and 37 a radiation shield.

The following examples serve to illustrate the invention. Ferrophosphorus containing 25.4% of phosphorus was used as starting material in each case:

Example 1

26.3 gm. of ferrophosphorus were heated in apparatus as shown in FIG. 1, to a temperature of 1450–1500° C. during a time of 60 mins. The temperature was measured by means of an external thermocouple in preference to an internal one which would have destroyed the cylindrical symmetry of the system. Oxygen-free nitrogen was blown on to the surface of the molten ferrophosphorus, the rate of flow of the nitrogen being gradually increased from 1.5 to 2.0 litres/min. The pressure in the system was atmospheric. A cavity formed in the surface of the melt as shown in FIG. 1. The yield of phosphorus was 26.4% of that originally present.

Example 2

The procedure of Example 1 was repeated, using 33.8 gm. of ferrophosphorus which were heated to a temperature of 1380°–1460° C. during a time of 65 mins. The yield of phosphorus was 23.1% of that originally present.

Example 3

Molten ferrophosphorus was heated in apparatus as shown in FIG. 5 to a temperature of 1450° C. and a vacuum of 0.5 mm. Hg was maintained. 65% of the phosphorus originally present was removed and recovered in one hour, and 90% in two hours.

With 90% removal of phosphorus, the low-phosphorus iron remaining contains less than 30% of phosphorus, and this is usable directly as pig iron.

Example 4

80 gm. of ferrophosphorus were heated to 1500° C. in apparatus as shown in FIG. 2. 4 gm. of phosphorus furnace slag were also present. The pressure was 10 mm. of mercury. The heating was continued for 60 mins., though the first 10 mins. of this time were taken in melting the ferrophosphorus from cold. The yield of phosphorus was 56.5% of that originally present.

What we claim is:

1. A process for recovering phosphorus from ferrophosphorus containing between 23% and 27% phosphorus, which comprises heating the ferrophosphorus to a temperature above its melting point, subjecting the molten ferrophosphorus to destructive distillation, leading off the resulting phosphorus vapour, and recovering phosphorus therefrom, heat being supplied during the distillation to maintain the temperature above the melting point of the ferrophosphorus being treated.

2. A process as claimed in claim 1, wherein the pressure is less than 10 mm. of mercury.

3. A process as claimed in claim 2, wherein the pressure is less than 1 mm. of mercury.

4. A process as claimed in claim 1, wherein the melt is subjected to gas purging, at least 56 litres of inert gas, measured at the pressure obtaining in the system, per gram of phosphorus to be recovered being caused to flow in contact with the melt.

5. A process as claimed in claim 1, wherein heat is supplied by induction heating.

6. A process as claimed in claim 1, wherein heat is supplied by arc heating.

7. A process as claimed in claim 6, wherein a little phosphorus furnace slag is present in the melt.

8. A process as claimed in claim 6, wherein one of the arc electrodes is a consumable rod of ferrophosphorus.

9. The process of claim 5, wherein the pressure is less than 10 mm. of mercury.

10. The process of claim 5, wherein the melt is subjected to gas purging, at least 56 liters of inert gas, measured at the pressure obtaining in the system, per gram of phosphorus to be recovered being caused to flow in contact with the melt.

11. The process of claim 6, wherein the pressure is less than 10 mm. of mercury.

12. The process of claim 6, wherein the melt is subjected to gas purging, at least 56 liters of inert gas, measured at the pressure obtaining in the system, per gram of phosphorus to be recovered being caused to flow in contact with the melt.

13. The process of claim 2 wherein the process is carried out until at least 25% of the phosphorus in the reactant ferrophosphorus is recovered.

14. The process of claim 13 wherein the molten ferrophosphorus is at a temperature between 1400° C. and 1550° C.

15. The process of claim 3 wherein the process is carried out until at least 50% of the phosphorus in the reactant ferrophosphorus is recovered.

16. The process of claim 15 wherein the molten ferrophosphorus is at a temperature between 1400° C. and 1550° C.

References Cited by the Examiner
UNITED STATES PATENTS

| | | | |
|---|---|---|---|
| 1,836,618 | 12/1931 | Pokomy | 23—223 |
| 2,838,372 | 6/1958 | Gall et al. | 23—223 X |
| 3,088,807 | 5/1963 | Williams | 23—223 |

MAURICE A. BRINDISI, Primary Examiner.